US010585496B2

(12) United States Patent
Jeon et al.

(10) Patent No.: US 10,585,496 B2
(45) Date of Patent: Mar. 10, 2020

(54) METHOD FOR RECOGNIZING TABLE FOR ELECTRONIC MENU SYSTEM BASED ON VISIBLE LIGHT AND APPARATUS USING THE SAME

(71) Applicant: Electronics and Telecommunications Research Institute, Daejeon (KR)

(72) Inventors: Ji-Hun Jeon, Daejeon (KR); Myung-Soon Kim, Daejeon (KR); Sang-Kyu Lim, Daejeon (KR); Tae-Gyu Kang, Daejeon (KR); Jong-Hyun Park, Seongnam-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 15/679,804

(22) Filed: Aug. 17, 2017

(65) Prior Publication Data
US 2018/0232066 A1 Aug. 16, 2018

(30) Foreign Application Priority Data
Feb. 10, 2017 (KR) .......................... 10-2017-0018620

(51) Int. Cl.
*G06F 3/03* (2006.01)
*H04W 4/021* (2018.01)
(Continued)

(52) U.S. Cl.
CPC ............ *G06F 3/0321* (2013.01); *G06F 3/011* (2013.01); *G06F 3/0304* (2013.01);
(Continued)

(58) Field of Classification Search
CPC ...... G06F 3/0321; G06F 3/011; G06F 3/0304; G06F 3/0482; G06F 3/0346; H04W 4/33;
(Continued)

(56) References Cited

U.S. PATENT DOCUMENTS 4,222,111 A * 9/1980 Sloan ..................... G08B 5/221
340/286.09
9,587,931 B2 3/2017 Son et al.
(Continued)

FOREIGN PATENT DOCUMENTS

KR 1020070047927 A 5/2007
KR 1020100040069 A 4/2010
(Continued)

OTHER PUBLICATIONS

Jie Lian and Maite Brandt-Pearce, Multiuser MIMO Indoor Visible Light Communication System Using Spatial Muliplexing, Dec. 2017 (Year: 2017).*

*Primary Examiner* — Florian M Zeender
*Assistant Examiner* — Nicole Elena Bruner
(74) *Attorney, Agent, or Firm* — William Park & Associates Ltd.

(57) ABSTRACT

Disclosed herein are a method for recognizing a table for an electronic menu system based on visible light and an apparatus for the same. The method includes receiving, by a visible light receiver connected to a smart device provided to a customer in a restaurant, multiple visible light signals from multiple lamps installed in the restaurant; detecting at least one valid signal from the multiple visible light signals in consideration of the multiple visible light signals and
(Continued)

sensor data collected from a sensor installed in the smart device; and recognizing a table at which the customer is sitting using table information included in the at least one valid signal.

17 Claims, 9 Drawing Sheets

(51) Int. Cl.
    *G06Q 50/12* (2012.01)
    *G06F 3/0482* (2013.01)
    *G06F 3/01* (2006.01)
    *H04B 10/116* (2013.01)
    *H04W 4/33* (2018.01)
    *G06F 3/0346* (2013.01)
    *G06Q 20/32* (2012.01)
    *G06Q 30/06* (2012.01)

(52) U.S. Cl.
    CPC ........... *G06F 3/0482* (2013.01); *G06Q 50/12* (2013.01); *H04B 10/116* (2013.01); *H04W 4/021* (2013.01); *H04W 4/33* (2018.02); *G06F 3/0346* (2013.01); *G06Q 20/3224* (2013.01); *G06Q 30/06* (2013.01)

(58) Field of Classification Search
    CPC ...... H04W 4/021; H04W 4/043; G06Q 50/12; H04B 10/116
    USPC .......................................................... 705/15
    See application file for complete search history.

(56) References Cited

U.S. PATENT DOCUMENTS

| | | | |
|---|---|---|---|
| 2005/0198318 A1* | 9/2005 | von Mueller | G06Q 20/3224 709/228 |
| 2006/0002254 A1* | 1/2006 | Ishihara | G11B 7/0956 369/44.32 |
| 2007/0136110 A1* | 6/2007 | Presley | G06Q 10/02 705/5 |
| 2010/0094715 A1 | 4/2010 | Kim et al. | |
| 2014/0010540 A1 | 1/2014 | Jeong et al. | |
| 2014/0236480 A1 | 8/2014 | Kang et al. | |
| 2015/0278926 A1* | 10/2015 | Fang | G06Q 50/12 705/15 |
| 2016/0247113 A1* | 8/2016 | Rademaker | G06Q 10/06311 |
| 2016/0275576 A1* | 9/2016 | Logan | H04W 4/043 |
| 2018/0041896 A1* | 2/2018 | Ji | H04W 12/06 |
| 2018/0374322 A1* | 12/2018 | Kim | H04B 5/02 |

FOREIGN PATENT DOCUMENTS

| | | |
|---|---|---|
| KR | 1020110133485 A | 12/2011 |
| KR | 1020130050066 A | 5/2013 |
| KR | 1020140042025 | 4/2014 |
| KR | 1020150069655 A | 6/2015 |
| KR | 1020150090931 A | 8/2015 |
| KR | 1020150138869 A | 12/2015 |
| WO | 2010100576 A1 | 9/2010 |

\* cited by examiner

METHOD FOR RECOGNIZING TABLE FOR ELECTRONIC MENU SYSTEM BASED ON VISIBLE LIGHT AND APPARATUS USING THE SAME

CROSS REFERENCE TO RELATED APPLICATION

This application claims the benefit of Korean Patent Application No. 10-2017-0018620, filed Feb. 10, 2017, which is hereby incorporated by reference in its entirety into this application.

BACKGROUND OF THE INVENTION

1. Technical Field

The present invention relates generally to technology for recognizing a table for an electronic menu system based on visible light, and more particularly to technology for providing table information by automatically recognizing a table at which a customer is sitting using a smart device, provided to the customer, and visible light lamps installed in a restaurant.

2. Description of the Related Art

In the case of a system and method using paper menus, menus and order forms in different languages are necessary and employees are required to have language skill in order to serve a customer who speaks a foreign language. Also, when a customer calls an employee and places an order, because the employee must visit the customer's table, take and confirm the order, and deliver the order to the kitchen, time and labor are needed, and an increase in cost and deterioration of service quality may be caused.

Recently, as a system for providing an electronic menu and order form via a smart device is used, the amount of time spent to take and confirm an order is reduced, whereby the service quality is somewhat improved. Also, because a system includes an electronic menu and order form in different languages, there is no limitation as to the language used by customers. However, because employees do not visit a table when taking an order or being called, there is no way to provide information about the position at which a customer is seated to a kitchen or a counter. Accordingly, an electronic menu system to which a corresponding table number has been input must be fixed to a table, a customer must input a corresponding table number to an electronic menu system, or a separate messaging system and devices must be used.

In order to solve such inconvenience, an electronic menu system that is capable of providing information about the position of a customer using RF communication has been developed. That is, thanks to a system that provides information about the position of a customer as well as an electronic menu and order form, the amount of time spent to take and confirm an order is reduced, which results in somewhat improved service quality. This system solves the inconvenience of inputting a table number, but it is necessary to install a position information generator including a separate power supply device at each table in a restaurant, which incurs installation and maintenance expenses. Also, when RF communication is used to receive position information, because the coverage area thereof is uncertain and RF communication has no directivity, a region in which multiple pieces of position information overlap may be generated. As a result, it is difficult to provide precise information about the position of a user.

SUMMARY OF THE INVENTION

An object of the present invention is to automatically recognize a table at which a customer is sitting by acquiring information about the positions of customers in a restaurant without installing a position information generator at each table.

Another object of the present invention is to provide an electronic menu system that may reduce the expense of installing an additional device in a restaurant or at tables or maintenance expense for periodically replacing batteries and the like.

A further object of the present invention is to provide precise information about the position of a customer based on visible light communication having high directivity, in which whether a communication link is present can be visually determined.

In order to accomplish the above objects, a method for recognizing a table according to the present invention includes receiving, by a visible light receiver connected to a smart device provided to a customer in a restaurant, multiple visible light signals from multiple lamps installed in the restaurant; detecting at least one valid signal from among the multiple visible light signals in consideration of the multiple visible light signals and sensor data collected from a sensor installed in the smart device; and recognizing a current table at which the customer is sitting using table information included in the at least one valid signal.

Here, detecting the at least one valid signal may be configured to detect a visible light signal received when the smart device is in a valid state as the at least one valid signal, among the multiple visible light signals.

Here, the method may further include measuring an acceleration of the smart device based on the sensor data; and determining that the smart device is in the valid state when a state in which the acceleration satisfies a preset acceleration condition is maintained for a preset time period.

Here, detecting the at least one valid signal may include measuring a tilt of the smart device based on the sensor data when the smart device is in the valid state; and calibrating and detecting the valid signal in consideration of an orientation of the smart device, inferred from the tilt, and a map of visible light lamps corresponding to the restaurant when the tilt does not satisfy a preset tilt condition.

Here, the method may further include determining whether information about a previous table, which is recognized earlier than the current table, is present in a menu application installed in the smart device when the current table at which the customer is sitting is recognized; determining whether the customer moved to a new table depending on whether the previous table is identical to the current table when it is determined that information about the previous table is present; and determining whether the current table is shared depending on whether another customer is already registered for the current table when it is determined that information about the previous table is not present.

Here, determining whether the customer moved may be configured to output an interface for prompting the customer to confirm whether the customer moved via the menu application when the previous table is not identical to the current table.

Here, determining whether the current table is shared may be configured to output an interface for prompting the customer to confirm whether to share the current table via the menu application when another customer is already registered for the current table.

Here, the method may further include providing a menu selection interface through a menu application installed in the smart device in order to enable the customer to select a menu item after recognizing the current table.

Here, the method may further include delivering, by a server interacting with the smart device, menu information, input via the menu selection interface, to a kitchen application installed in a kitchen device in the restaurant, along with a time at which an order was taken and a table number; and outputting information about progress of the order, which is updated using the kitchen application, via the menu application.

Here, the method may further include delivering, by a server interacting with the smart device, menu information, input via the menu selection interface, to a counter application installed in a counter device in the restaurant, along with a time at which an order was taken and a table number; displaying at least one of an order, the time at which the order was taken, and a bill for the table in the counter application based on the menu information; and updating information about the order to a payment completion state when the customer has paid the bill.

Also, a server for an electronic menu system based on visible light according to an embodiment of the present invention includes a reception unit for receiving multiple visible light signals and sensor data about a smart device from the smart device, which is connected to a visible light receiver and is provided to a customer in a restaurant; and a control unit for detecting at least one valid signal from among the multiple visible light signals in consideration of the multiple visible light signals and the sensor data and for recognizing a table at which the customer is sitting using table information included in the at least one valid signal.

Here, the control unit may detect a visible light signal received when the smart device is in a valid state as the at least one valid signal, among the multiple visible light signals, and may determine that the smart device is in the valid state when a state in which an acceleration of the smart device, measured based on the sensor data, satisfies a preset acceleration condition is maintained for a preset time period.

Here, the control unit may be configured to measure a tilt of the smart device based on the sensor data when the smart device is in the valid state, and to calibrate and detect the valid signal in consideration of an orientation of the smart device, inferred from the tilt, and a map of visible light lamps corresponding to the restaurant when the tilt does not satisfy a preset tilt condition.

Here, the server may further include an output unit for outputting an interface for prompting the customer to confirm whether the customer moved via a menu application installed in the smart device depending on whether a first table is identical to a second table when it is determined that there is information about the second table recognized earlier than the first table, corresponding to a currently recognized table.

Here, the output unit may output an interface for prompting the customer to confirm whether to share the table via the menu application depending on whether another customer is already registered for the first table when it is determined that information about the second table is not present.

Here, the control unit may be configured to provide a menu selection interface through a menu application installed in the smart device in order to enable the customer to select a menu item after recognizing the table; to deliver menu information, input via the menu selection interface, to a kitchen application installed in a kitchen device in the restaurant, along with a time at which an order was taken and a table number; and to output information about progress of the order, updated using the kitchen application, to the smart device via the menu application.

Here, the control unit may be configured to deliver the menu information, the time at which the order was taken, and the table number to a counter application installed in a counter device in the restaurant; and to update information about the order corresponding to the table number to a payment completion state when the customer has paid a bill.

Also, a smart device for an electronic menu system based on visible light according to an embodiment of the present invention includes a visible light signal reception unit for receiving multiple visible light signals from multiple lamps installed in a restaurant using a visible light receiver; and a table recognition unit for detecting at least one valid signal from among the multiple visible light signals in consideration of the multiple visible light signals and sensor data acquired using at least one of an acceleration sensor and a gyro sensor, and for recognizing a table at which a customer is sitting in the restaurant using table information included in the at least one valid signal.

Here, the table recognition unit may detect a visible light signal received when the smart device is in a valid state as the at least one valid signal, among the multiple visible light signals, and may determine that the smart device is in the valid state when a state in which an acceleration of the smart device, measured based on the sensor data, satisfies a preset acceleration condition is maintained for a preset time period.

Here, the table recognition unit may be configured to measure a tilt of the smart device based on the sensor data when the smart device is in the valid state; and to calibrate and detect the valid signal in consideration of an orientation of the smart device, inferred from the tilt, and a map of visible light lamps corresponding to the restaurant when the tilt does not satisfy a preset tilt condition

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
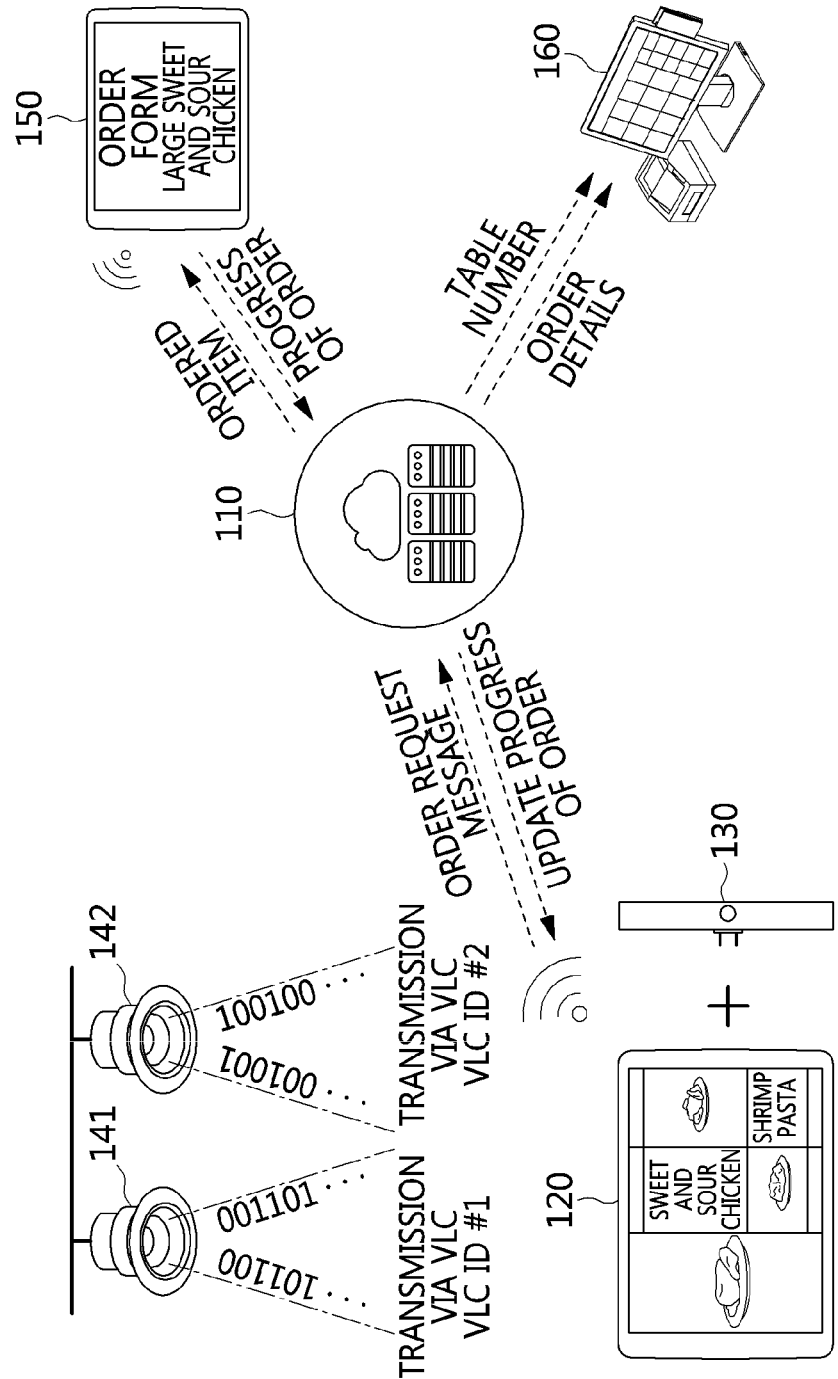
FIG. 1 and FIG. 2 are views that show an electronic menu system based on visible light according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 2:
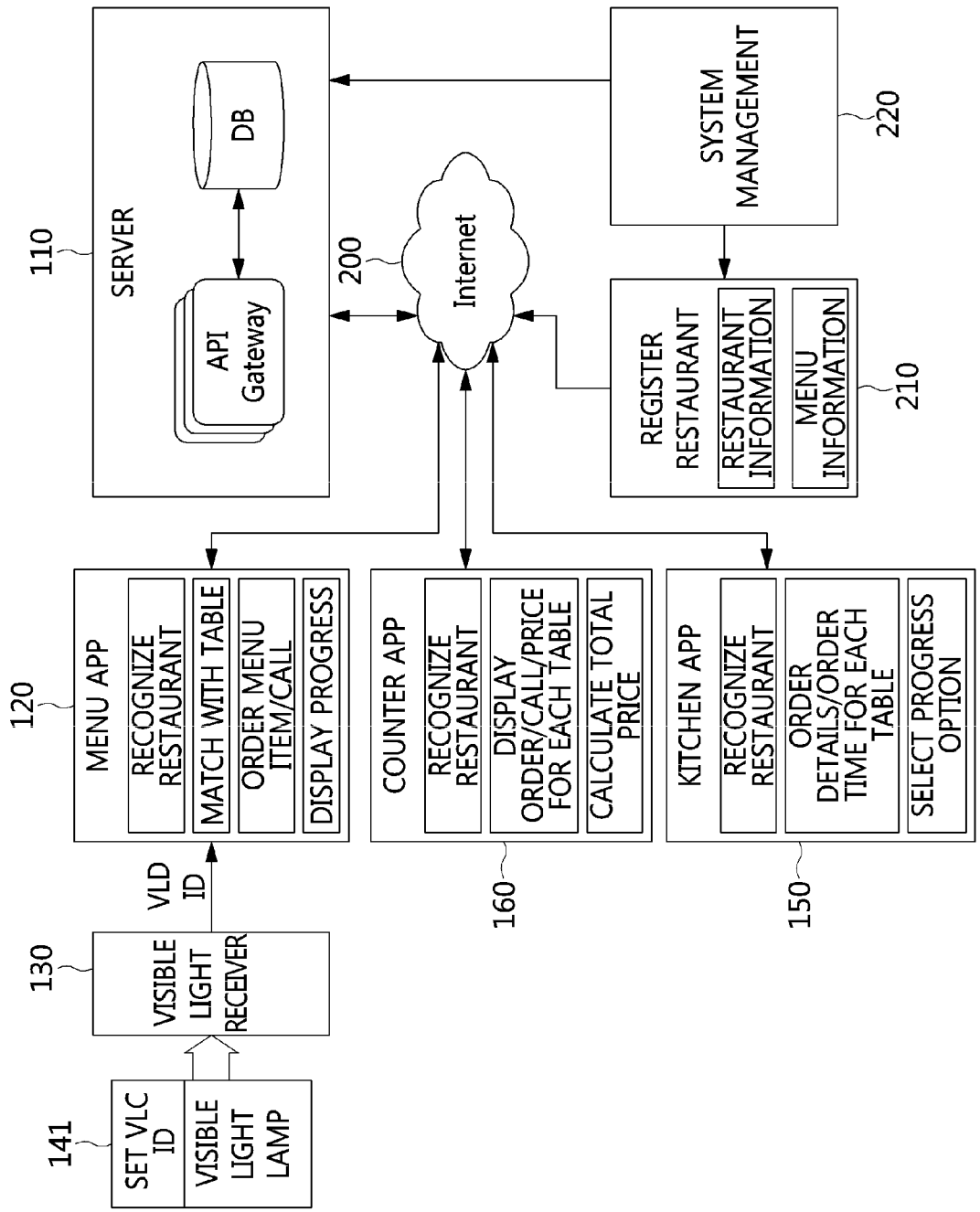

FIGS. 1 and 2 are views that show an electronic menu system based on visible light according to an embodiment of the present invention.

Because conventional electronic menu systems cannot acquire information about the position of a user, they use a method of fixing an electronic menu, to which a corresponding table number has been input in advance, to every table. However, this method is problematic in that the expense of installing an electronic menu is increased and in that a user or an employee is required to manually input a table number to the electronic menu depending on the circumstances.

In order to solve these problems, an electronic menu system that receives position information using RF communication has been developed. However, when a position information generator that needs a separate power supply device is installed in a table, wiring incurs infrastructure cost, spoils the aesthetic appearance of the interior, and causes inconvenience attributable to the fastened wire. Also, when batteries are used to supply power, all batteries must be periodically replaced, which incurs maintenance expense. Furthermore, due to an uncertain coverage area of RF communication and the low directivity thereof, incorrect information may be acquired.

In order to solve the above-mentioned problems, the present invention intends to propose an electronic menu system using visible light and a method for recognizing a table for the electronic menu system. That is, because a visible light communication function is added to lamps installed on the ceiling of a shop or a restaurant, the expense of installing and managing separate position information generators may be avoided, and precise position information may be provided using visible light communication having high directivity, in which whether a communication link is present can be visually determined.

Referring to FIG. 1, an electronic menu system based on visible light according to an embodiment of the present invention includes a server 110, a smart device 120, a visible light receiver 130, visible light lamps 141 and 142, a PC in the kitchen 150, and a PC at the counter 160.

The server 110 may store information about a shop or a restaurant in a database by interacting with the smart device 120, the PC in the kitchen 150, and the PC at the counter 160 based on a wired or wireless network, the Internet, or the like. For example, information about an order pertaining to a unique table number, which is assigned to each table, information about menu items served at a restaurant, event information, and statistical information of the restaurant, such as order details, sales information, and the like may be stored in the database.

Also, the server 110 stores information collected or updated by at least one of the smart device 120, the PC in the kitchen 150, and the PC at the counter 160, and may share the information stored in the database, so that the smart device 120, the PC in the kitchen 150, or the PC at the counter 160 may retrieve the information therefrom.

The smart device 120 may be a device provided to a customer who visits a shop or a restaurant. In the smart device 120, a menu application for providing information about a menu of the restaurant is installed. Also, because the visible light receiver 130 is attached to the smart device 120, visible light signals transmitted from the visible light lamps 141 and 142 may be received. For example, the visible light receiver 130 may be connected to the smart device 120 via micro-USB.

Here, the visible light lamp 141 or 142 may modulate VLC ID data into a visible light signal and send the visible light signal. Accordingly, the visible light receiver 130 may demodulate the visible light signal, received from the visible light lamp 141 or 142, to VLC ID data and deliver it to the smart device 120.

Here, the visible light lamps 141 and 142 may be lamps installed in the restaurant. For example, the visible light lamps may include visible light lamps installed above tables in the restaurant, visible light lamps installed in the passage, and the like.

Here, because all of the visible light lamps installed in the restaurant transmit visible light signals including their own VLC ID data, the VLC ID of a visible light signal, received by the visible light receiver 130, may be used to detect the position of a customer who carries the smart device 120.

Here, using a menu application installed in the smart device 120, the VLC ID data is retrieved from a map of visible light lamps in the restaurant, and the table matching the lamp corresponding to the VLC ID may be recognized.

Here, the map of visible light lamps may include the VLC ID and the position of each of the multiple lamps installed in the restaurant and information about a table matched therewith.

Here, the map of visible light lamps may be stored in the database of the server 110, and the smart device 120 may retrieve the map of visible light lamps from the server 110.

Here, visible light communication is communication technology for wirelessly delivering information using light in the wavelength range from 380 to 780 nm, which is visible to human eyes. That is, visible light communication differs from existing wired optical communication and wireless infrared communication using light in the infrared band in that it uses light in the visible light wavelength band. Also, unlike RF communication, which is currently widely used, visible light communication may be freely used without regulations or permissions from the aspect of frequency usage. Also, visible light communication has excellent physical security and is distinctive in that a user may visually check whether communication is proceeding. Furthermore, visible light communication is a representative convergent technology that may perform a communication function while providing a function as a light source.

Subsequently, based on the recognized table number, the menu application generates an order message or a staff call message in response to a request from a customer, and may store the generated message in the server 110.

For example, when an order message is generated, the order message stored in the server 110 is shared with the PC in the kitchen 150 and the PC at the counter 160, whereby it may be announced that a customer has placed an order. Also, after receipt of the order is confirmed by a kitchen application installed in the PC in the kitchen 150, the progress of the order depending on the cooking process in the kitchen may be displayed via the menu application of the smart device 120.

Here, the kitchen application installed in the PC in the kitchen 150 may display a table number, the time at which the order was taken, a list of ordered items, and the like based on the order message stored in the server 110. Then, while ordered food is cooked in the kitchen, the progress of the order may be input using state buttons that represent the cooking progress. In response to input of the state button depending on the cooking progress, the server 110 may update information about the progress of the order and provide it to the customer via the menu application of the smart device 120.

The PC at the counter 160 may search for an order message stored in the server 110 using a counter application, and may display ordered items, the time at which the order is taken, and the total price for each table. For example, a table GUI is displayed on the monitor of the PC at the counter 160, and ordered items, the time at which the order is taken, a request message, and the total price may be displayed on each table GUI, whereby a manager behind a counter may easily check them.

Also, when a customer has paid the bill, information is updated to indicate that payment pertaining to the ordered message of the customer, who carries the smart device 120, has been completed, using the counter application, and the updated information may be stored in the server 110.

Figure 3:
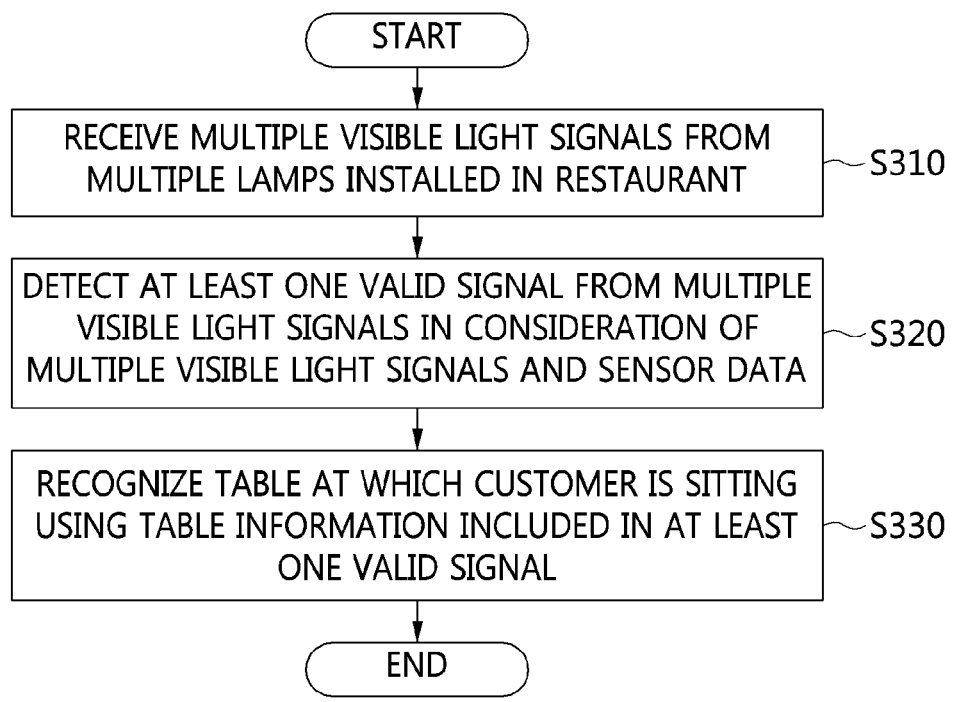
FIG. 3 is a flowchart that shows a method for recognizing a table for an electronic menu system based on visible light according to an embodiment of the present invention.

FIG. 3 is a flowchart that shows a method for recognizing a table for an electronic menu system based on visible light according to an embodiment of the present invention.

Referring to FIG. 3, in the method for recognizing a table for an electronic menu system based on visible light according to an embodiment of the present invention, a visible light receiver connected to a smart device provided to a customer in a restaurant receives multiple visible light signals from multiple lamps installed in the restaurant at step S310.

Here, the multiple lamps installed in the restaurant are visible light lamps that are capable of visible light communication, and a VLC ID set on each of the multiple lamps may be delivered to the visible light receiver using visible light transmitted from the lamp.

Accordingly, the visible light receiver detects a VLC ID from the received visible light and retrieves the detected VLC ID from a server via the smart device, whereby the visible light lamp directly above the customer who carries the smart device may be detected.

Also, in the method for recognizing a table for an electronic menu system based on visible light according to an embodiment of the present invention, in consideration of multiple visible light signals and sensor data collected from a sensor installed in the smart device, at least one valid signal is detected from among the multiple visible light signals at step S320.

Here, the smart device itself may detect the valid signal, or a server that receives the multiple visible light signals and the sensor data from the smart device may detect the valid signal.

Here, using the Internet, the server may communicate with the smart device, a kitchen PC installed in the kitchen of the restaurant, a counter PC installed at the counter of the restaurant, and a system management server for managing the electronic menu system.

Here, various types of sensors for sensing the state of the smart device may be installed in the smart device. For example, an acceleration sensor capable of measuring the acceleration of the smart device while a customer who carries the smart device is moving, a gyro sensor for measuring the tilt of the smart device, and the like may be included.

Here, among the multiple visible light signals, a visible light signal, received when the smart device is in a valid state, may be detected as at least one valid signal.

Here, the valid state may represent the state in which it is appropriate to recognize the table at which a customer is sitting. For example, if a table is recognized when a customer who carries the smart device is passing by Table 1, the smart device receives a visible light signal from the visible light lamp installed directly above Table 1, and thus it may be mistakenly determined that the customer is sitting at Table 1.

As described above, when it is determined that the current state is not appropriate to recognize a table because a customer is moving, even if the smart device receives a visible light signal, the visible light signal may not be determined to be a valid signal for recognizing a table. However, visible light signals received while a customer is moving may be used to detect the path along which the customer is moving.

Also, although not illustrated in FIG. 3, in the method for recognizing a table for an electronic menu system based on visible light according to an embodiment of the present invention, the acceleration of the smart device is measured based on sensor data, and when the state in which the measured acceleration satisfies a preset acceleration condition is maintained for a preset time period, the smart device may be determined to be in the valid state.

For example, the acceleration condition may be set such that, when the set acceleration condition is satisfied, it can be determined that the customer who carries the smart device is not moving. Also, in consideration of the case in which the customer carrying the smart device stops walking for a moment or the case in which the customer slows down in order to look for a table at which to sit, a certain time period is preset, and only when the acceleration condition is satisfied for the preset time period is the smart device determined to be in the valid state. Here, the preset time period may be freely set and modified by the manager of the restaurant depending on the characteristics of the restaurant.

Accordingly, if the smart device stays stationary, that is, stays in the state in which the acceleration thereof satisfies the preset acceleration condition, for the preset time period, it is determined to be a valid state, in which the customer who carries the smart device is sitting at a table, and thus the table may be recognized.

Here, when the smart device is in the valid state, the tilt of the smart device is measured using the sensor data, and when the tilt does not satisfy a tilt condition, a valid signal is calibrated and detected in consideration of the orientation of the smart device, inferred from the tilt, and the map of visible light lamps of the restaurant.

For example, if the customer who carries the smart devices sits at Table 1 and places the smart device on Table 1 such that it is tilted, the smart device may receive a visible light signal from the visible light lamp installed directly above Table 2, neighboring Table 1. In this case, the electronic menu system may mistakenly determine that the customer is sitting at Table 2.

Therefore, even if the smart device is determined to be in the valid state, whether the currently received visible light signal is a valid signal may be determined using information about the orientation of the smart device.

Also, in the method for recognizing a table for an electronic menu system based on visible light according to an embodiment of the present invention, the table at which a customer is sitting is recognized at step S330 using table information included in at least one valid signal.

Here, the table information may include a table number, information about whether the table is occupied, and the like.

Also, although not illustrated in FIG. 3, in the method for recognizing a table for an electronic menu system based on visible light according to an embodiment of the present invention, when a table at which a customer is sitting is recognized, whether information about a previously recognized table is present in the menu application installed in the smart device may be determined.

Here, if information about a previous table is present, whether a customer moves to a new table may be determined depending on whether the previous table is the same as the recognized table. If information about a previous table is not present, whether the recognized table is shared may be determined depending on whether another customer is already registered for the table.

Here, if the previous table is not identical to the recognized table, an interface for prompting a customer to confirm whether the customer has moved may be displayed via the menu application.

For example, after a customer sits at Table 1 and thus the electronic menu system recognizes the table at which the customer is sitting as Table 1, when the customer moves to Table 2, Table 1 corresponds to a previous table and Table 2 corresponds to the currently recognized table. In this case, because the previous table differs from the currently recognized table, whether the customer moved to another table may be checked.

Also, when another customer is already registered for the currently recognized table, an interface for asking the customer whether to share the currently recognized table may be displayed via the menu application.

For example, when a customer receives a smart device from an employee and sits at Table 1 in the state in which a companion of the customer is already sitting at Table 1, information about a previous table is not present, but Table 1 is already matched with customer information of the companion of the customer. In this case, whether to share Table 1 may be checked using the smart device carried by the customer.

Also, although not illustrated in FIG. 3, in the method for recognizing a table for an electronic menu system based on visible light according to an embodiment of the present invention, after the table at which a customer is sitting is recognized, a menu selection interface may be provided via the menu application installed in the smart device in order to enable the customer to select items from a menu.

Here, the menu selection interface may include an order button for selecting and ordering a menu item and a call button for calling an employee, as well as menu information registered in the corresponding restaurant.

Also, although not illustrated in FIG. 3, in the method for recognizing a table for an electronic menu system based on visible light according to an embodiment of the present invention, information about ordered items input via the menu selection interface is delivered to the kitchen application installed in the PC in the kitchen, along with the time at which the order was taken and table information, and information about the progress of the order, updated by the kitchen application, may be output via the menu application.

Also, although not illustrated in FIG. 3, in the method for recognizing a table for an electronic menu system based on visible light according to an embodiment of the present invention, information about ordered items input via the menu selection interface may be delivered to the counter application installed in the PC at the counter, along with the time at which the order was taken and table information.

Here, based on information about the ordered items, at least one of order details, the time at which the order was taken, and the total bill for the table may be displayed via the counter application, and when the customer has paid the bill, information about the order may be updated to a payment completion state.

Also, in the method for recognizing a table according to the present invention, steps S320 and S330 illustrated in FIG. 3 may be performed by at least one of the smart device and the server, which constitute the electronic menu system based on visible light. Here, a result of the process performed by at least one of the smart device and the server is stored in the server, whereby other devices may retrieve it.

Through the above-mentioned method for recognizing a table, information about the positions of customers in a restaurant is acquired without installing a position information generator at each table, whereby the table at which a customer is sitting may be automatically recognized.

Figure 4:
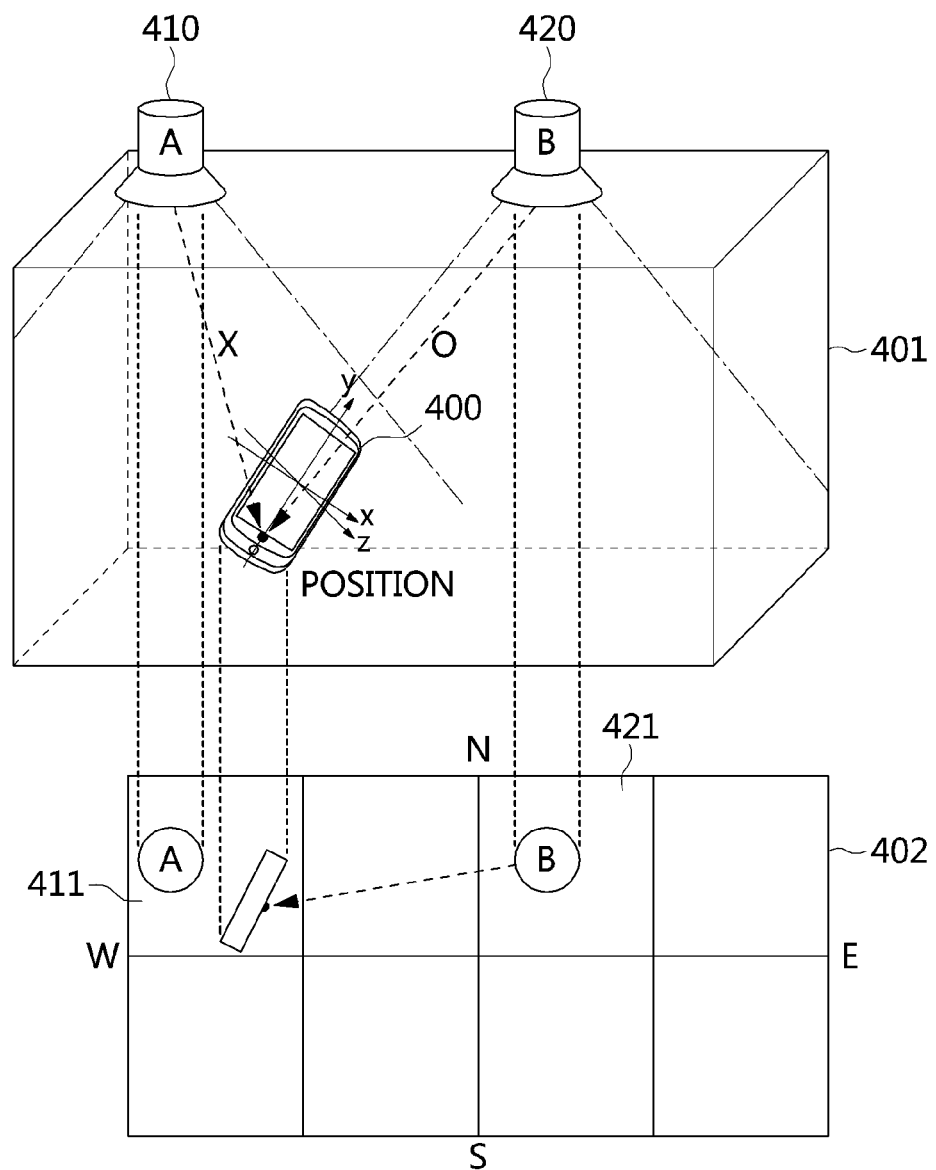
FIG. 4 is a view that shows an example of the process of calibrating a valid signal depending on the tilt of a smart device and detecting the calibrated valid signal when a table is recognized according to the present invention.

FIG. 4 is a view that shows an example of the process of calibrating and detecting a valid signal depending on the tilt of a smart device when a table is recognized according to the present invention.

Referring to FIG. 4, a customer who carries a smart device 400 is assumed to be seated at a table 411 located below a visible light lamp A 410 in a certain space 401 in the restaurant.

Here, if the customer is sitting at the table 411 below the visible light lamp A but places the smart device 400 so as to be oriented toward a visible light lamp B 420, as shown in FIG. 4, the smart device 400 may not receive a visible light signal transmitted from the visible light lamp A 410 but may instead receive a visible light signal transmitted from the visible light lamp B 420. That is, the customer is sitting at the table 411 below the visible light lamp A, but an electronic menu system may mistakenly recognize that the customer is sitting at the table 421 below the visible light lamp B.

Here, in order to prevent the above problem, the method for recognizing a table according to an embodiment of the present invention includes the process of measuring the tilt of the smart device 400 using a gyro sensor installed therein when the smart device 400 is determined to be in a valid state in which a table can be recognized, that is, in which the smart device 400 stays stationary, and then a visible light signal determined to be a valid signal may be calibrated using the tilt.

Accordingly, in the example illustrated in FIG. 4, it is determined that the smart device 400 does not satisfy a preset tilt condition, and thus the valid signal is calibrated in consideration of the orientation of the smart device 400 and a map of visible light lamps in the restaurant in order to determine the smart device 400 is located on the table 411 below the lamp A in the table area 402, and then the calibrated valid signal may be delivered to the menu application.

For example, when the smart device 400 is oriented as shown in FIG. 4, the position at which the visible light signal transmitted from the visible light lamp B 420 can arrive may be determined through the map of visible light lamps of the restaurant, whereby a valid signal may be calibrated.

Figure 5:
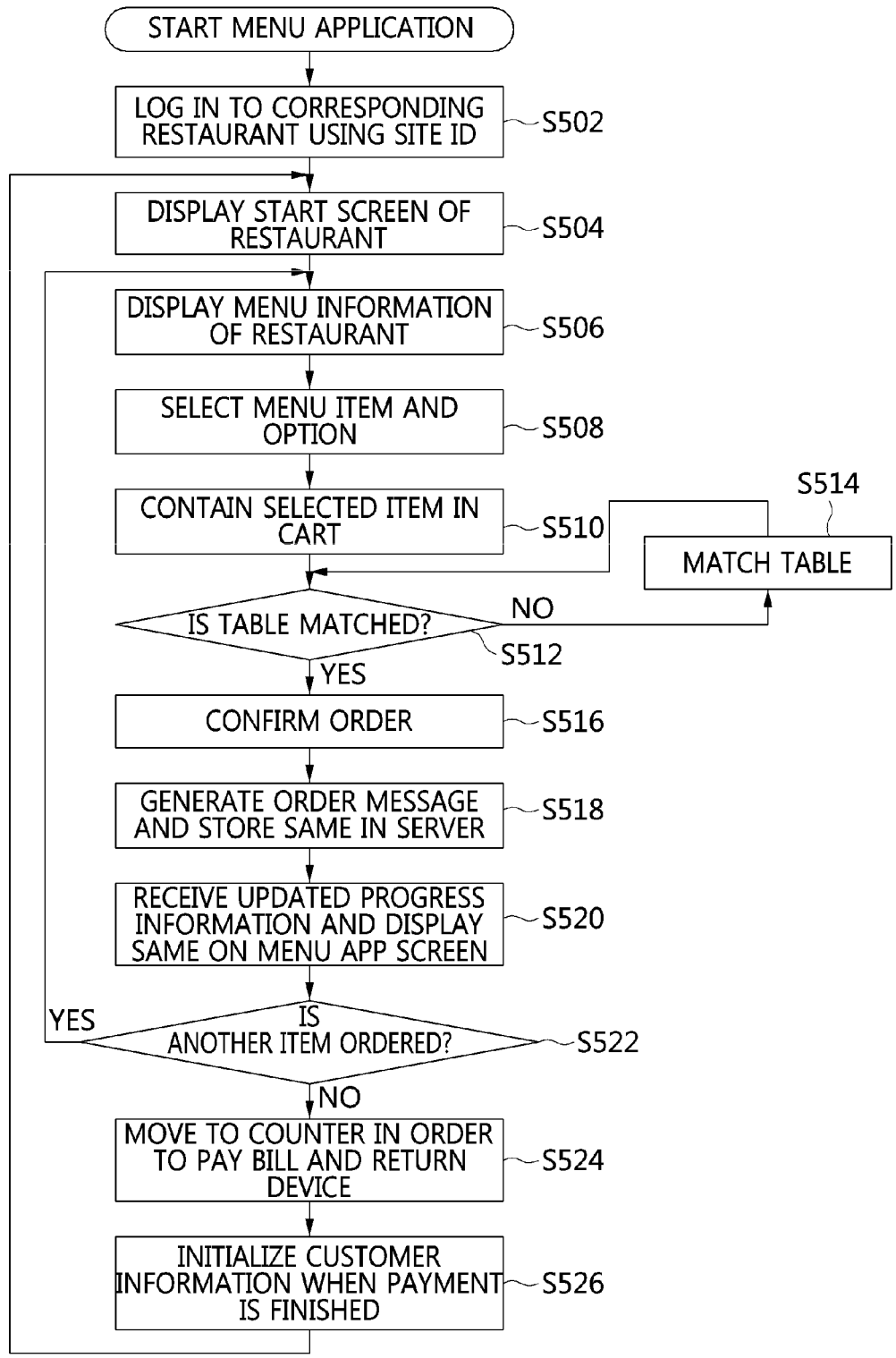
FIG. 5 is a flowchart that shows an example of the overall operation process of an electronic menu system based on visible light according to the present invention.

FIG. 5 is a flowchart that shows an example of the overall operation process of an electronic menu system based on visible light according to the present invention.

Referring to FIG. 5, in the overall operation process of an electronic menu system based on visible light according to the present invention, when a restaurant employee first runs a menu application after installing it in a smart device, a screen for requesting the employee to log in may be displayed via the menu application.

Here, when login is performed at step S502 by inputting the site ID and password of the corresponding restaurant, information about the restaurant is received from a server, and a start screen set by the corresponding restaurant may be displayed in the smart device at step S504.

Then, the restaurant employee holds the smart device in which the start screen is displayed and delivers it to a customer who enters the restaurant.

Here, when the customer receives the smart device, sits at a table, and touches the start screen, the start screen changes to a screen on which the menu of the restaurant is displayed, and a method for recognizing a table according to the present invention may be performed.

Here, while the customer selects a menu item, the menu application may automatically recognize a table number, corresponding to the current table at which the customer is sitting, through the process of recognizing a table.

Also, when the table number is recognized, the menu application may generate a guest ID message, which is configured with the table number, the current time, the ID of the smart device, and the like, and deliver the guest ID message to the server. Here, the process of generating and delivering a guest ID message may be regarded as a customer registration process for providing information about a customer, the table occupied by the customer, the device used by the customer, and the time at which the customer was seated at the table.

Then, while a table is recognized through the background process of the menu application, the menu application may display a menu, which was received when the restaurant is recognized, on the screen at step S506.

Then, the customer may select a desired item from the menu displayed on the screen of the smart device at step S508.

When the customer selects a menu item, the menu item selected by the customer may be added to a cart of the menu application at step S510.

Here, whenever a menu item is added to the cart, all of the selected items and the total price are displayed, and an item may be removed from the cart or the number of items may be modified.

When the customer presses an order button after finally modifying the order, whether the recognition of the table has been completed is checked at step S512, and the order may be confirmed at step S516 after it is determined that the table has been recognized.

Also, when it is determined at step S512 that the table has not yet been recognized, the order may be confirmed after the table is recognized.

After the order is confirmed, an order message, which is the guest ID message to which information about the selected menu items, the time at which the order is taken, and the like are added, may be delivered to the server at step S518.

Then, when a kitchen application updates progress information pertaining to the order message stored in the server, the menu application may read the updated order message and display the current progress of the ordered menu items at step S520.

Then, whether there is an additional order is checked at step S522, and when it is determined that there is an additional order, the process of selecting and ordering menu items may be repeated in the menu application.

When it is determined at step S522 that there is no additional order, a step of calculating the price may proceed.

That is, when the customer who finishes eating moves to the counter with the smart device at step S524, the restaurant employee takes back the smart device, checks the order information of the customer, and carries out a payment process.

Here, when the payment is completed, the guest ID message of the customer is updated, and the menu application of the smart device reverts to the start screen upon recognizing that payment pertaining to the corresponding guest ID is completed. Accordingly, the table recognition information stored in the menu application may be initialized at step S526.

Figure 6:
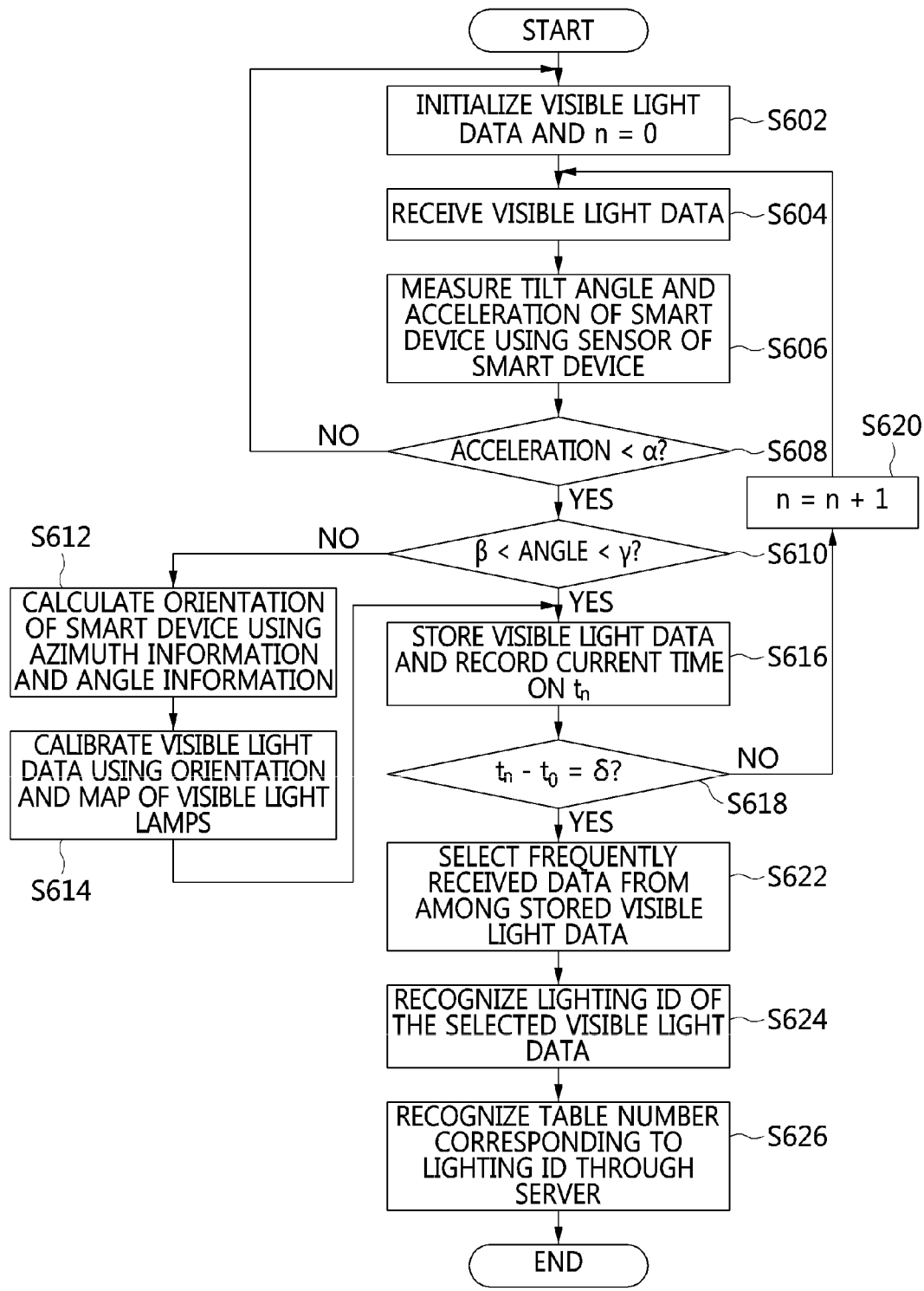
FIG. 6 is a flowchart that specifically shows the process of calibrating a valid signal in a method for recognizing a table according to an embodiment of the present invention.

FIG. 6 is flowchart that specifically shows the process of calibrating a valid signal in a method for recognizing a table according to an embodiment of the present invention.

Referring to FIG. 6, in the process of recognizing a table according to an embodiment of the present invention, whenever it receives a visible light signal from multiple lamps installed in a restaurant, a visible light receiver demodulates it to visible light data and delivers the visible light data to a menu application. Accordingly, when a visible light signal is received while a customer who carries a smart device is moving or in the state in which a smart device is placed so as to be tilted toward a lamp above another table, erroneous visible light data may be received.

In order to distinguish an invalid visible light signal from a valid visible light signal, received when a smart device is placed on the table at which a customer is sitting, the algorithm illustrated in FIG. 6 is needed.

Referring to FIG. 6, first, a variable containing previously stored visible light data and a timer may be initialized at step S602.

Then, when a visible light signal is received at step S604, the orientation (angle or tilt) and the acceleration of the smart device may be measured at step S606.

Here, acceleration measured using an acceleration sensor installed in the smart device is compared with acceleration a based on acceleration due to gravity, whereby whether the smart device is moving may be determined at step S608.

When it is determined at step S608 that the smart device is moving because the measured acceleration is equal to or greater than acceleration due to gravity, the received visible light data is ignored and the timer may be initialized at step S602.

Also, when it is determined at step S608 that the smart device is not moving because the measured acceleration is less than acceleration due to gravity, the tilt of the smart device is measured using a gyro sensor, whereby whether the angle at which the smart device is tilted falls within a suitable range, within which the smart device can receive a visible light signal from a lamp above the table on which the smart device is placed, is determined at step S610.

When it is determined at step S610 that the angle at which the smart device is tilted falls out of the suitable range, the orientation and posture of the smart device are calculated at step S612 by measuring the azimuth information using a sensor within the smart device. Then, using the calculated orientation value and a map of visible light lamps in the restaurant, the received visible light data is calibrated to visible light data corresponding to the table on which the smart device is actually placed, and is then delivered to the server at step S614.

Also, when it is determined at step S610 that the angle at which the smart device is tilted falls within the suitable range, the received visible light data may be delivered to the server without calibration.

Then, the server may store the visible light data, received from the smart device, along with the current time at step S616.

Then, whether the smart device stays stationary for a certain time period is determined at step S618, and when it is determined that the smart device stays stationary for the certain time period, data that is most frequently received during the certain time period may be selected from among the visible light data stored in the server at step S622.

Then, a visible light lamp ID corresponding to the selected visible light data is recognized at step S624, and the table number corresponding to the recognized visible light lamp ID is received from the server, and the table number may be regarded as the table number of the table at which the customer is sitting at step S626.

As described above, the electronic menu system may extract meaningful visible data by operating in conjunction with the sensor of the smart device, and may thereby provide accurate information about the table at which a customer is sitting.

Figure 7:
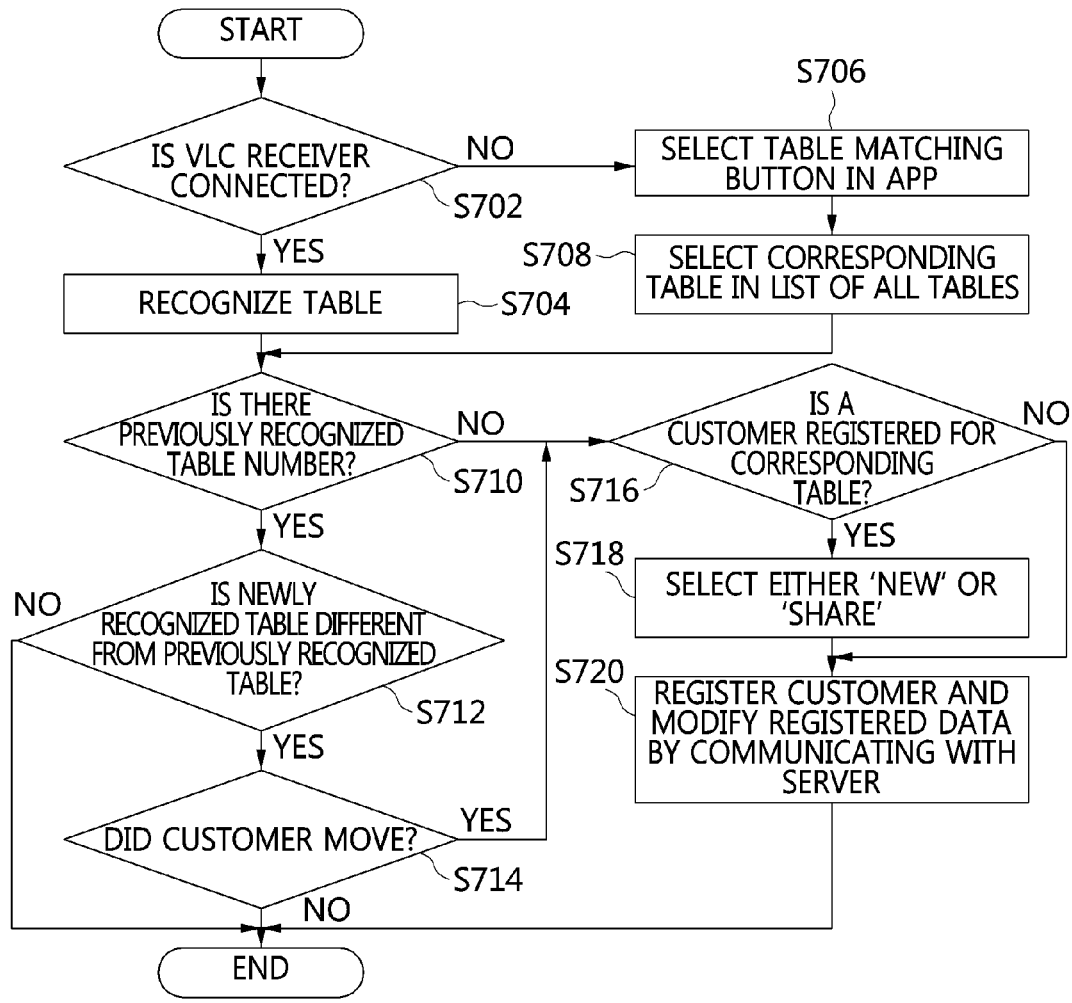
FIG. 7 is a flowchart that specifically shows the process of recognizing a table depending on whether information about a previously recognized table is present in a method for recognizing a table according to an embodiment of the present invention.

FIG. 7 is a flowchart that specifically shows the process of recognizing a table depending on whether a previously recognized table is present in the method for recognizing a table according to an embodiment of the present invention.

Referring to FIG. 7, in the process of recognizing a table depending on whether a previously recognized table is present in the method for recognizing a table according to an embodiment of the present invention, first, when the screen of a menu application is changed from the start screen of a restaurant to a menu screen, the process of recognizing a table is started.

Here, when the process of recognizing a table is started, whether a visible light receiver is connected to a smart device is checked first at step S702.

When it is determined at step S702 that a visible light receiver is not connected to the smart device, a customer or an employee presses a table-matching button in the menu application at step S706, and a manual table-matching process for selecting a table from among all the tables in the restaurant may be performed at step S708.

Also, when it is determined at step S702 that a visible light receiver is connected to the smart device, the menu application may automatically recognize the table at which a customer is sitting at step S704 through the process of recognizing a table according to the present invention.

Here, whenever it receives a visible light signal from visible light lamps, the visible light receiver delivers it to the menu application. Accordingly, using the table recognition algorithm according to the present invention, the menu application ignores an invalid visible light signal, which is received while a customer who carries the smart device is moving or is received when the smart device is tilted to a certain degree, and may recognize a table using a visible light signal received in a valid state, that is, received when the smart device is placed flat on the corresponding table.

Then, when the table number of the table at which the customer is currently sitting is recognized using the table recognition algorithm or through the process of manually selecting the table, whether a previously recognized table number is present in the menu application may be checked at step S710.

When it is determined at step S710 that a previously recognized table number is present, whether the previously recognized table number is identical to the currently recognized table number is determined at step S712.

When it is determined at step S712 that the previously recognized table number differs from the currently recognized table number, it is determined that the customer has moved, and the customer may be prompted to confirm whether the customer moved to another table at step S714.

Here, when it is determined at step S712 that the previously recognized table number is the same as the currently recognized table number, the currently recognized table number is recognized as the table number of the table at which the customer is sitting, and the process of taking an order may be performed.

Also, when it is determined at step S710 that there is no previously recognized table number, or when it is confirmed at step S714 that the customer has moved to another table, whether there is another customer already registered for the currently recognized table number may be checked at step S716.

When it is determined at step S716 that there is no customer registered for the currently recognized table number, the recognition of a table is completed, and the process for taking an order may be performed.

Also, when it is determined at step S716 that another customer already registered for the currently recognized table number is present, whether to share the table may be selected using the menu application at step S718. Here, people in different parties may share a table depending on the number and size of tables in the restaurant, or a customer may be a member of a party that arrived earlier than the customer. Accordingly, any one of 'new customer' and 'share table' may be selected depending on the circumstances.

Then, a guest ID message is generated based on the recognized table number, the time, and the smart device ID, and is then delivered to the server, whereby customer information may be registered for the corresponding table at step S720.

If a customer receives a smart device and sits at a free table, the process of selecting a button for movement to another table or a button for sharing a table is skipped, and the process of selecting and ordering a menu item may be automatically performed.

Figure 8:
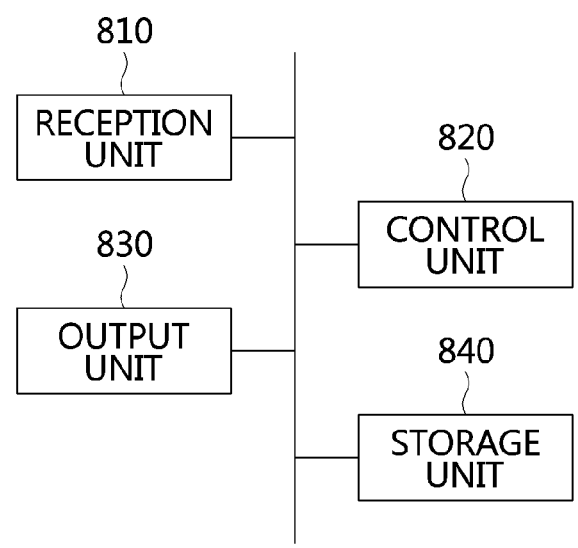
FIG. 8 is a block diagram that shows a server for an electronic menu system based on visible light according to an embodiment of the present invention.

FIG. 8 is a block diagram that shows a server for an electronic menu system based on visible light according to an embodiment of the present invention.

Referring to FIG. 8, a server for an electronic menu system based on visible light according to an embodiment of the present invention may include a reception unit 810, a control unit 820, an output unit 830, and a storage unit 840.

The reception unit 810 receives multiple visible light signals and sensor data from a smart device, which is connected to a visible light receiver and is provided to a customer in a restaurant.

Here, in the smart device, a menu application through which a customer may select a menu item may be installed.

Here, when the smart device is first used, a corresponding restaurant is recognized and menu information is acquired using the menu application. For example, when an employee of the restaurant runs a restaurant registration application for registering a restaurant via the menu application of the smart device and registers the restaurant, menu information corresponding to the registered restaurant may be acquired.

Here, a visible light receiver, connected to the smart device, may receive multiple visible light signals from multiple lamps installed in the restaurant.

Here, the multiple lamps installed in the restaurant are visible light lamps that are capable of visible light communication, and a VLC ID set on each of the multiple lamps may be delivered to the visible light receiver using visible light transmitted from the lamp.

Accordingly, the visible light receiver detects a VLC ID from the received visible light and retrieves the detected VLC ID from the server via the smart device, whereby the visible light lamp directly above the customer who carries the smart device may be detected.

The control unit 820 detects at least one valid signal from among multiple visible light signals in consideration of the multiple visible light signals and sensor data, and recognizes the table at which a customer is sitting using table information included in the at least one valid signal.

Here, the server may communicate with the smart device, a PC in the kitchen, a PC at the counter, and a system management server, using the Internet.

Here, the Internet means a network that provides a channel via which the server, the smart device, the PC in the kitchen, the PC at the counter, and the system management server send and receive data therebetween. The network may be conceptually understood as including networks that are currently being used and networks that have yet to be developed. For example, the network may be any one of wired and wireless local networks for providing communication between various kinds of data devices in a limited area, a mobile communication network for providing communication between mobile devices or between a mobile device and the outside thereof, a satellite network for providing communication between earth stations using a satellite, and a wired and wireless communication network, or may be a combination of two or more selected therefrom. Meanwhile, a transmission protocol standard for the network is not limited to existing transmission protocol standards, but may include all transmission protocol standards to be developed in the future.

Here, information about the customer who carries the smart device is matched with the recognized table information, and is then stored in the storage unit 840 of the server.

Here, various types of sensors for sensing the state of the smart device may be installed in the smart device. For example, the various types of sensors may include an acceleration sensor capable of measuring the acceleration of the smart device while a customer who carries the smart device is moving, a gyro sensor for measuring the tilt of the smart device, and the like.

Here, among the multiple visible light signals, a visible light signal received when the smart device is in a valid state may be detected as at least one valid signal.

Here, the valid state may represent the state in which it is appropriate to recognize the table at which a customer is sitting. For example, if a table is recognized when a customer who carries the smart device is passing by Table 1, the smart device receives a visible light signal from the visible light lamp installed directly above Table 1, and thus it may be mistakenly determined that the customer is sitting at Table 1.

As described above, when it is determined that the current state is not appropriate to recognize a table because a customer is moving, even if the smart device receives a visible light signal, the visible light signal may not be a valid signal for recognizing a table. However, visible light signals received while a customer is moving may be used to detect the path along which the customer is moving.

Here, the acceleration of the smart device is measured based on sensor data, and if the state in which the measured acceleration satisfies a preset acceleration condition is maintained for a preset time period, the smart device may be determined to be in the valid state.

For example, the acceleration condition may be set such that, when the set acceleration condition is satisfied, it can be determined that the customer who carries the smart device is not moving. Also, in consideration of the case in which the customer carrying the smart device stops walking for a moment or the case in which the customer slows down in order to look for a table at which to sit, a certain time period is preset, and only when the acceleration condition is satisfied for the preset time period is the smart device determined to be in the valid state. Here, the preset time period may be freely set and modified by the manager of the restaurant depending on the characteristics of the restaurant.

Accordingly, if the smart device stays stationary for the preset time period, that is, remains in the state in which the acceleration thereof satisfies the preset acceleration condition for the preset time period, it is determined to be a valid state in which the customer who carries the smart device is sitting at a table, and thus the table may be recognized.

Here, when the smart device is in the valid state, the tilt of the smart device is measured using the sensor data, and when the tilt does not satisfy a tilt condition, a valid signal is calibrated and detected in consideration of the orientation of the smart device, inferred from the tilt thereof, and a map of visible light lamps of the restaurant.

For example, if the customer who carries a smart device sits at Table 1 and places the smart device on Table 1 so as to be tilted, the smart device may receive a visible light signal from the visible light lamp installed directly above Table 2, neighboring Table 1. In this case, the electronic menu system may mistakenly determine that the customer is sitting at Table 2.

Therefore, even if the smart device is determined to be in the valid state, whether the currently received visible light signal is a valid signal may be determined using the tilt of the smart device.

Because the process of calibrating the valid signal depending on the tilt of the smart device has been described with reference to FIG. 4 and FIG. 6, a detailed description thereof will be omitted.

Here, after the table at which a customer is sitting is recognized, a menu selection interface may be provided via the menu application installed in the smart device in order to enable the customer to select items from a menu.

Here, the menu selection interface may include an order button for selecting and ordering a menu item and a call button for calling an employee as well as menu information registered in the corresponding restaurant.

Here, information about the ordered items input via the menu selection interface is delivered to a kitchen application installed in the PC in the kitchen, along with the time at which the order was taken and table information, and information about the progress of the order, updated by the kitchen application, may be output via the menu application.

Here, information about the ordered items input via the menu selection interface may be delivered to a counter application installed in the PC at the counter, along with the time at which the order was taken and table information.

Here, based on information about the ordered items, at least one of order details, the time at which the order was taken, and the total bill for the table may be displayed via the counter application, and when the customer has paid the bill, information about the order may be updated to a payment completion state.

The output unit 830 may determine whether information about a second table recognized earlier than a first table, corresponding to the currently recognized table, is present in the menu application installed in the smart device when the first table at which a customer is sitting is recognized.

Here, if it is determined that there is information about the second table, whether the customer has moved is checked depending on whether the first table is the same as the second table, and if it is determined that there is no information about the second table, whether the first table is shared may be determined depending on whether another customer is registered for the first table.

Here, when it is determined that the first table differs from the second table, an interface for asking the customer whether the customer has moved may be displayed using the menu application.

For example, after a customer sits at Table 1 and thus the electronic menu system recognizes the table at which the customer is sitting as Table 1, when the customer moves to Table 2, Table 1 corresponds to a previous table and Table 2 corresponds to the currently recognized table. In this case, because Table 1 differs from Table 2, whether the customer has moved to another table may be checked.

Here, when another customer is already registered for Table 1, an interface for asking the customer whether to share Table 1 may be displayed via the menu application.

For example, when a customer receives a smart device from an employee and sits at Table 1 in the state in which a companion of the customer is already sitting at Table 1, information about a previous table is not present, but Table 1 is already matched with customer information of the companion of the customer. In this case, whether to share Table 1 may be checked using the smart device carried by the customer.

Also, the server according to an embodiment of the present invention is monitored by a separate system management server, and when a problem occurs, the system management server notifies the administrator of the server of the problem in order to quickly respond thereto.

The storage unit 840 may store various kinds of information generated in the server according to an embodiment of the present invention.

According to an embodiment, the storage unit 840 may be configured to be separate from the server, and may support the function of recognizing a table. Here, the storage unit 840 may operate as separate mass storage, and may include a control function for performing operation.

Because a table can be recognized based on the server configured as described above, information about the positions of customers in a restaurant may be acquired without installing a position information generator at each table, whereby the table at which a customer is sitting may be automatically recognized.

Figure 9:
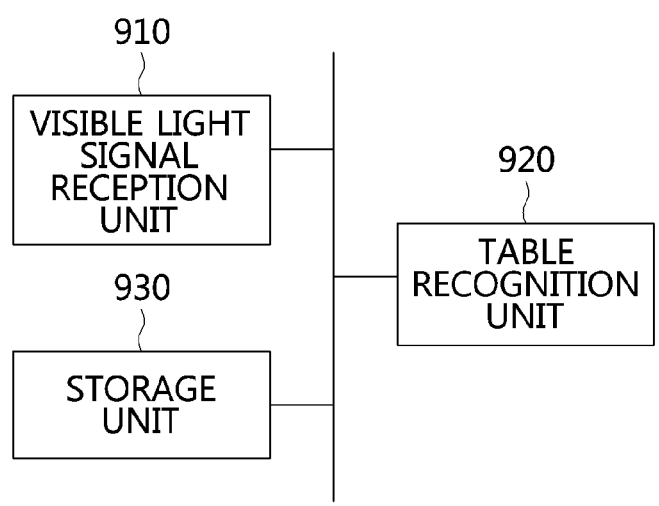
FIG. 9 is a block diagram that shows a smart device for an electronic menu system based on visible light according to an embodiment of the present invention.

FIG. 9 is a block diagram that shows a smart device for an electronic menu system based on visible light according to an embodiment of the present invention.

Referring to FIG. 9, a smart device for an electronic menu system based on visible light according to an embodiment of the present invention includes a visible light signal reception unit 910, a table recognition unit 920 and a storage unit 930.

Here, the smart device is provided to a customer who enters a restaurant, and a menu application for enabling the customer to select a menu item may be installed in the smart device.

Here, when the smart device is first used, a corresponding restaurant is recognized and menu information is acquired using the menu application. For example, when an employee of the restaurant runs a restaurant registration application for registering a restaurant via the menu application of the smart device and then registers the restaurant, menu information corresponding to the registered restaurant may be acquired.

The visible light signal reception unit 910 receives multiple visible light signals from multiple lamps installed in the restaurant using a visible light receiver.

Here, the multiple lamps installed in the restaurant are visible light lamps that are capable of visible light communication, and a VLC ID set on each of the multiple lamps may be delivered to the visible light receiver using visible light transmitted from the lamp.

Accordingly, the visible light receiver detects a VLC ID from the received visible light and retrieves the detected VLC ID from a server via the smart device, whereby the visible light lamp directly above a customer who carries the smart device may be detected.

The table recognition unit 920 detects at least one valid signal from among multiple visible light signals in consideration of the multiple visible light signals and sensor data acquired using at least one of an acceleration sensor and a gyro sensor, and recognizes the table at which a customer is sitting using table information included in the at least one valid signal.

Here, information about the customer who carries the smart device is matched with information about the recognized table, and is then stored in the storage unit 930. Also, through the interaction with a server, information about the recognized table may be provided to a PC in the kitchen and a PC at the counter.

Here, various types of sensors for sensing the state of the smart device may be installed in the smart device. For example, the various types of sensors may include an acceleration sensor capable of measuring acceleration while a customer who carries the smart device is moving, a gyro sensor for measuring the tilt of the smart device, and the like.

Here, among the multiple visible light signals, a visible light signal, received when the smart device is in a valid state, may be detected as at least one valid signal.

Here, the valid state may represent the state in which it is appropriate to recognize the table at which a customer is sitting. For example, if a table is recognized when a customer who carries the smart device is passing by Table 1, the smart device receives a visible light signal from the visible light lamp installed directly above Table 1, and thus it may be mistakenly determined that the customer is sitting at Table 1.

As described above, when it is determined that the current state is not appropriate to recognize a table because a customer is moving, even if the smart device receives a visible light signal, the visible light signal may not be determined to be a valid signal for recognizing a table.

However, visible light signals received while a customer is moving may be used to detect the path along which the customer is moving.

Here, the acceleration of the smart device is measured based on sensor data, and if the state in which the measured acceleration satisfies a preset acceleration condition is maintained for a preset time period, the smart device may be determined to be in the valid state.

For example, the acceleration condition may be set such that, when the set acceleration condition is satisfied, it can be determined that the customer who carries the smart device is not moving. Also, in consideration of the case in which the customer carrying the smart device stops walking for a moment or the case in which the customer slows down in order to look for a table at which to sit, a certain time period is preset, and only when the acceleration condition is satisfied for the preset time period is the smart device determined to be in the valid state. Here, the preset time period may be freely set and modified by the manager of the restaurant depending on the characteristics of the restaurant.

Accordingly, if the smart device stays stationary for the preset time period, that is, stays in the state in which the acceleration thereof satisfies the preset acceleration condition for the preset time period, it is determined to be a valid state in which the customer who carries the smart device is sitting at a table, and thus the table may be recognized.

Here, when the smart device is in the valid state, the tilt of the smart device is measured using the sensor data, and when the tilt does not satisfy a preset tilt condition, a valid signal is calibrated and detected in consideration of the orientation of the smart device, inferred from the tilt, and a map of visible light lamps of the restaurant. Here, the map of visible light lamps of the restaurant may be acquired from the server.

For example, if a customer who carries a smart device sits at Table 1 and places the smart device on Table 1 so as to be tilted, the smart device may receive a visible light signal from the visible light lamp installed directly above Table 2, neighboring Table 1. In this case, the electronic menu system may mistakenly determine that the customer is sitting at Table 2.

Therefore, even if the smart device is determined to be in the valid state, whether the currently received visible light signal is a valid signal may be determined using the tilt of the smart device.

Because the process of calibrating the valid signal depending on the tilt of the smart device has been described with reference to FIG. 4 and FIG. 6, a detailed description thereof will be omitted.

Here, after the table at which a customer is sitting is recognized, a menu selection interface may be provided via the menu application installed in the smart device in order to enable the customer to select items from a menu.

Here, the menu selection interface may include an order button for selecting and ordering a menu item and a call button for calling an employee as well as menu information registered in the corresponding restaurant.

Here, through communication with the server, information about the ordered items input via the menu selection interface is delivered to a kitchen application installed in the PC in the kitchen, along with the time at which the order was taken and table information, and information about the progress of the order, updated by the kitchen application, may be output via the menu application.

Here, through communication with the server, information about the ordered items input via the menu selection interface may be delivered to a counter application installed in the PC at the counter, along with the time at which the order was taken and table information.

Here, based on information about the ordered items, at least one of the order details, the time at which the order was taken, and the total bill for the table may be displayed via the counter application, and when the customer has paid the bill, information about the order may be updated to a payment completion state.

Also, whether information about a second table, recognized earlier than a first table, which corresponds to the currently recognized table, is present in the menu application may be determined when the first table, at which a customer is sitting, is recognized.

Here, if it is determined that there is information about the second table, whether the customer has moved is checked depending on whether the first table is the same as the second table, and if it is determined that there is no information about the second table, whether the first table is shared may be determined depending on whether another customer is registered for the first table.

Here, when it is determined that the first table differs from the second table, an interface for asking the customer whether the customer has moved to another table may be displayed using the menu application.

For example, after a customer sits at Table 1 and thus the electronic menu system recognizes the table at which the customer is sitting as Table 1, when the customer moves to Table 2, Table 1 corresponds to a previous table and Table 2 corresponds to the currently recognized table. In this case, because Table 1 differs from Table 2, whether the customer has moved to another table may be checked.

Here, when another customer is already registered for Table 1, an interface asking the customer whether to share Table 1 may be displayed via the menu application.

For example, when a customer receives a smart device from an employee and sits at Table 1 in the state in which a companion of the customer is already sitting at Table 1, information about a previous table is not present, but Table 1 is already matched with customer information of the companion of the customer. In this case, whether to share Table 1 may be checked using the smart device carried by the customer.

The storage unit 930 may store various kinds of information generated in the smart device according to an embodiment of the present invention.

Because a table can be recognized based on the above-described smart device, information about the positions of customers in a restaurant may be acquired without installing a position information generator at each table, whereby the table at which a customer is sitting may be automatically recognized.

According to the present invention, a table at which a customer is sitting may be automatically recognized by acquiring information about the positions of customers in a restaurant, without installing a position information generator at each table.

Also, the present invention may provide an electronic menu system that may reduce the expense of installing an additional device in a restaurant or at tables or maintenance expense for periodically replacing batteries, and the like.

Also, the present invention may provide precise information about the position of a customer based on visible light communication having high directivity, in which whether a communication link is present can be visually determined.

As described above, the apparatus and method for recognizing a table for an electronic menu system based on visible light according to the present invention are not limitedly applied to the configurations and operation of the above-described embodiments, but all or some of the embodiments may be selectively combined and configured, so that the embodiments may be modified in various ways.

What is claimed is:

1. A method for recognizing a table for an electronic menu system based on visible light sent from multiple lamps installed in a restaurant, comprising:

receiving, by a visible light receiver connected to a smart device provided to a customer in the restaurant, multiple visible light signals from the multiple lamps installed in the restaurant;

detecting at least one valid signal from among the multiple visible light signals in consideration of the multiple visible light signals and sensor data collected from a sensor installed in the smart device;

recognizing a current table at which the customer is sitting using table information included in the at least one valid signal; and via programming instructions on the smart device:

when the current table at which the customer is sitting is recognized, determining whether information about a previous table, which is recognized earlier than the current table, is present in a menu application installed in the smart device;

when it is determined that information about the previous table is present, determining whether the customer moved to a new table depending on whether the previous table is identical to the current table; and when it is determined that information about the previous table is not present, determining whether the current table is shared depending on whether another customer is already registered for the current table, when another customer is already registered for the currently recognized table, an interface for asking the customer whether to share the currently recognized table may be displayed via the menu application.

2. The method of claim 1, wherein the detecting at least one valid signal further comprises detecting a visible light signal received when the smart device is in a valid state as the at least one valid signal, among the multiple visible light signals.

3. The method of claim 2, further comprising:
measuring an acceleration of the smart device based on the sensor data; and
determining that the smart device is in the valid state when a state in which the acceleration satisfies a preset acceleration condition is maintained for a preset time period.

4. The method of claim 2, wherein detecting the at least one valid signal comprises:
measuring a tilt of the smart device based on the sensor data when the smart device is in the valid state; and
calibrating and detecting the valid signal in consideration of an orientation of the smart device, inferred from the tilt, and in consideration of a map of visible light lamps corresponding to the restaurant accessible from a server database, when the tilt does not satisfy a preset tilt condition.

5. The method of claim 1 wherein the determining whether the customer moved to a new table further comprises outputting an interface for prompting the customer to confirm whether the customer moved via the menu application when the previous table is not identical to the current table.

6. The method of claim 1 wherein the determining whether the current table is shared further comprises outputting an interface for prompting the customer to confirm whether to share the current table via the menu application when another customer is already registered for the current table.

7. The method of claim 1, further comprising: after recognizing the current table, providing a menu selection interface through a menu application installed in the smart device in order to enable the customer to select a menu item.

8. The method of claim 7, further comprising:
based on a server interacting with the smart device, delivering menu information, input via the menu selection interface, to a kitchen application installed in a kitchen device in the restaurant, along with a time at which an order was taken and a table number; and
outputting information about progress of the order, which is updated using the kitchen application, via the menu application.

9. The method of claim 7, further comprising:
based on a server interacting with the smart device, delivering menu information, input via the menu selection interface, to a counter application installed in a counter device in the restaurant, along with a time at which an order was taken and a table number;
displaying at least one of an order, the time at which the order was taken, and a bill for the table in the counter application based on the menu information; and
updating information about the order to a payment completion state when the customer has paid the bill.

10. A server for an electronic menu system based on visible light sent from multiple lamps installed in a restaurant, comprising:

a reception unit for receiving multiple visible light signals and sensor data about a smart device from the smart device, which is connected to a visible light receiver and is provided to a customer in the restaurant;

a control unit for detecting at least one valid signal from among the multiple visible light signals in consideration of the multiple visible light signals and the sensor data and for recognizing a table at which the customer is sitting using table information included in the at least one valid signal, and an output unit for outputting an interface for prompting the customer to confirm whether the customer moved from a second table to a first table via a menu application installed in the smart device depending on whether the first table is identical to the second table when it is determined that there is information about the second table recognized earlier than the first table, wherein the first table is a currently recognized first table, wherein the output unit outputs an interface for prompting the customer to confirm whether to share a same table via the menu application when another customer is already registered for the first table when it is determined that information about the second table is not present.

11. The server of claim 10, wherein the control unit detects a visible light signal received when the smart device is in a valid state as the at least one valid signal, among the multiple visible light signals, and determines that the smart device is in the valid state when a state in which an acceleration of the smart device, measured based on the sensor data, satisfies a preset acceleration condition is maintained for a preset time period.

12. The server of claim 11, wherein the control unit is configured to measure a tilt of the smart device based on the sensor data when the smart device is in the valid state, and to calibrate and detect the valid signal in consideration of an orientation of the smart device, inferred from the tilt, and in consideration of a map of visible light lamps corresponding to the restaurant accessible from a database of the server, when the tilt does not satisfy a preset tilt condition.

13. The server of claim 10, wherein the control unit is configured to:
   provide a menu selection interface through a menu application installed in the smart device in order to enable the customer to select a menu item after recognizing the table;
   deliver menu information, input via the menu selection interface, to a kitchen application installed in a kitchen device in the restaurant, along with a time at which an order was taken and a table number; and
   output information about progress of the order, updated using the kitchen application, to the smart device via the menu application.

14. The server of claim 13, wherein the control unit is configured to:
   deliver the menu information, the time at which the order was taken, and the table number to a counter application installed in a counter device in the restaurant;
   and update information about the order corresponding to the table number to a payment completion state when the customer has paid a bill.

15. A smart device for an electronic menu system based on visible light from multiple lamps installed in a restaurant, comprising:
   a visible light signal reception unit for receiving multiple visible light signals from the multiple lamps installed in the restaurant using a visible light receiver; and
   a table recognition unit for detecting at least one valid signal from among the multiple visible light signals in consideration of the multiple visible light signals and sensor data acquired using at least one of an acceleration sensor and a gyro sensor, and for recognizing a table at which a customer is sitting in the restaurant using table information included in the at least one valid signal
   wherein the table recognition unit outputs an interface for prompting the customer to confirm whether the customer moved from a second table to a first table via a menu application installed in the smart device depending on whether the first table is identical to the second table when it is determined that there is information about the second table recognized earlier than the first table, wherein the first table is a currently recognized first table,
   wherein the table recognition unit outputs an interface for prompting the customer to confirm whether to share a same table via the menu application when another customer is already registered for the first table when it is determined that information about the second table is not present.

16. The smart device of claim 15, wherein the table recognition unit detects a visible light signal received when the smart device is in a valid state as the at least one valid signal, among the multiple visible light signals, and determines that the smart device is in the valid state when a state in which an acceleration of the smart device, measured based on the sensor data, satisfies a preset acceleration condition is maintained for a preset time period.

17. The smart device of claim 16, wherein the table recognition unit is configured to:
   measure a tilt of the smart device based on the sensor data when the smart device is in the valid state; and
   calibrate and detect the valid signal in consideration of an orientation of the smart device, inferred from the tilt, and in consideration of a map of visible light lamps corresponding to the restaurant accessible from a server database, when the tilt does not satisfy a preset tilt condition.

* * * * *